Aug. 5, 1930.                  C. A. BENJAMIN                 1,772,176
          STUB RECEIVING AND EXTINGUISHING ADJUNCT FOR MOTOR VEHICLES
                            Filed July 3, 1929
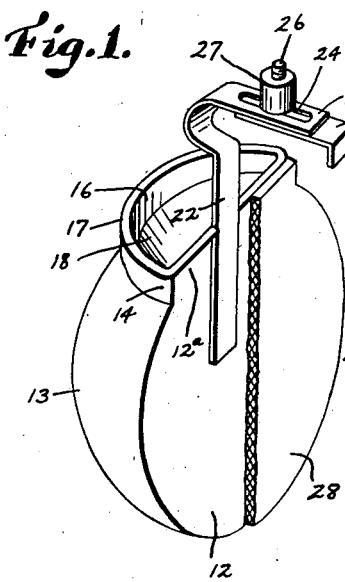
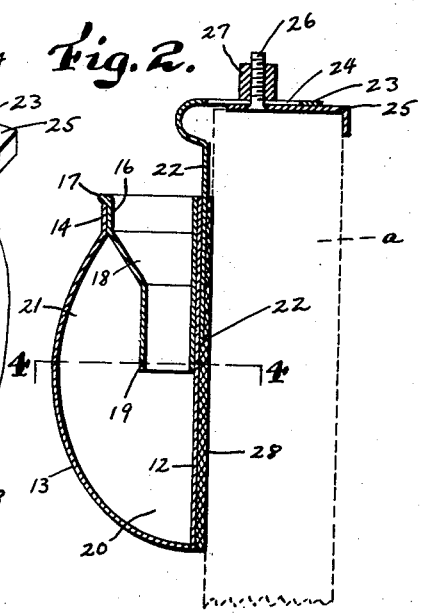
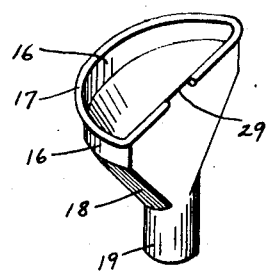
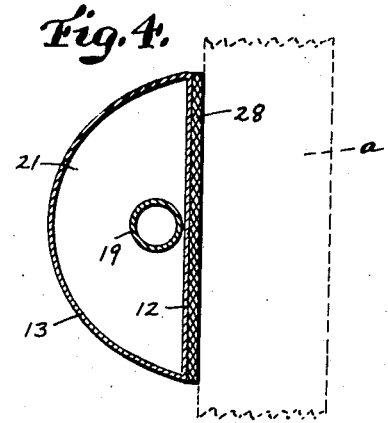
Inventor
Charles A. Benjamin
Attys.

Patented Aug. 5, 1930

1,772,176

UNITED STATES PATENT OFFICE

CHARLES A. BENJAMIN, OF WEST BRIDGEWATER, MASSACHUSETTS

STUB RECEIVING AND EXTINGUISHING ADJUNCT FOR MOTOR VEHICLES

Application filed July 3, 1929. Serial No. 375,738.

This invention relates to a receptacle for use by smokers, and adapted to be supported in a motor vehicle, as an adjunct thereof, in position to receive cigar and cigarette ashes and stubs.

The object of the invention is to provide certain improvements in the construction of the receptacle whereby it is adapted to bear on a supporting surface in a motor vehicle, without liability of being engaged and accidentally displaced by occupants of the vehicle.

Of the accompanying drawings forming a part of this specification,—

Figure 1 is a perspective view of an adjunct embodying the invention.

Figure 2 is a vertical section of the same.

Figure 3 is a perspective view of the funnel shown by Figures 1 and 2.

Figure 4 is a section on line 4—4 of Figure 2.

The same reference characters indicate the same parts in all of the figures.

My improved adjunct comprises a receptacle adapted to bear at one side on an internal surface of a motor vehicle, for example, the inner side of a door $a$, indicated by dotted lines in Figures 2 and 4.

The receptacle is composed of a flat inner side 12, including a major portion formed to have an extended bearing on the support and stabilize the receptacle, and provided with a curved margin as shown by Figure 1, and an outer side 13, which is curved and substantially concavo-convex, and joined at its curved margin to the margin of the flat side 12, so that the entire outer surface of the receptacle is rounded and practically free from liability to be displaced or knocked edgewise by contact with moving objects in the vehicle. The receptacle has a receiving neck at its upper end formed, by a flat extension 12$^a$ of the side 12, and a curved extension or flange 14 on the side 13.

The said neck is formed to receive a funnel which includes a receiving mouth portion 16, adapted to closely and separably fit the receptacle neck, and provided with an outwardly projecting bead 17, formed to bear on the upper edge of said neck. The mouth portion 16 so closely fits the receptacle neck that it forms therewith a practically airtight joint. The funnel also includes a tapered body portion 18, below the mouth portion, and a tubular spout 19, below the body portion.

The funnel projects into the receptacle and is separated from the bottom thereof by a stub-receiving space 20 (Figure 2). The funnel forms the inner wall of a smoke pocket 21, the outer wall of which is formed by the upper portion of the receptacle, said pocket being above and communicating with the stub-receiving space 20, and closed at its top by the joint formed by the receiving neck of the receptacle and the receiving mouth 16 of the funnel.

A shank 22 is attached to the flat side 12 thereto and projects upwardly from the midlength portion thereof, as shown by Figure 1, the upper end of the shank being provided with clamping means adapted to engage a supporting portion of the vehicle, such as the upper end of the portion $a$. Said means, as here shown, is embodied in an arm portion 23 of the shank, having a slot 24, a hooked slide 25, movable on the arm portion and having a threaded stud 26, projecting through and movable in the slot 24, and a clamping nut 27, engaged with the stud and adapted to adjustably clamp the arm 23 and the slide 25 together.

A facing layer 28 of felt or other suitable non-abrasive frictional material may be fixed to the inner side 12, to bear on the support $a$. The receptacle including the flat inner side 12, having an extended stabilizing bearing on the support $a$, and the convex outer side 13, bulging from the inner side and presenting an exposed surface which is curved throughout its entire area, is well adapted to be suspended by means such as the shank 22 and the clamping devices thereon, from the upper portion of said support, and is free from liability to be accidentally displaced or moved edgewise on the support by contact of body portions of the occupants of the vehicle with the exposed side. The projection of the side 13 into the vehicle is limited, and the storage capacity of the receptacle is ample, as indicated by Figures 2 and 4.

The funnel is removable from the receptacle to permit emptying and cleaning. The bead 17 is interrupted to form a space 29 (Figure 3) through which the shank 22 extends, as shown by Figure 1. The facing 28 contacts frictionally with the support *a* to oppose edgewise movement of the receptacle on the support.

I claim:

1. A stub-receiving and extinguishing adjunct for a motor vehicle, said adjunct comprising a receptacle having a flat inner side adapted to bear on a flat supporting surface in the vehicle, and including a flat major portion having a curved margin and a neck portion in the same plane with the major portion, and a substantially concavo-convex outer side joined to the curved margin of the inner side and including an arcuate neck portion joined to the flat neck portion, said neck portions forming a contracted receptacle neck, and a funnel having a receiving mouth formed to fit said neck, the concavo-convex outer side sloping from the curved margin of the flat inner side, so that the outer side is free from liability to be engaged with and displaced by moving objects in the vehicle, the flat back being provided with means for attaching the receptacles to a support.

2. A stub-receiving and extinguishing adjunct for a motor vehicle, said adjunct comprising a receptacle having a flat inner side adapted to bear on a flat supporting surface in the vehicle, and including a flat major portion having a curved margin and a neck portion in the same plane with the major portion and a substantially concavo-convex outer side joined in the curved margin of the inner side and including an arcuate neck portion joined to the flat neck portion, said neck portion forming a contracted receptacle neck, a funnel having a receiving mouth formed to fit said neck, an outwardly projecting bead formed on the upper edge of the mouth and adapted to bear on the upper edge of the neck, the concavo-convex outer side sloping from the curved margin of the flat inner side, so that the outer side is free from liability to be engaged with and displaced by moving objects in the vehicle, and a supporting member secured on the flat back and extending upwardly beyond the neck, the adjacent portion of said bead being cut-out to accommodate the supporting member, and a yielding facing covering the flat back and said supporting member.

In testimony whereof I have affixed my signature.

CHARLES A. BENJAMIN.